United States Patent [19]

Cole

[11] 3,850,460

[45] Nov. 26, 1974

[54] HIGH STRENGTH STRUCTURAL CONNECTOR

[76] Inventor: Clyde C. Cole, 5298 Harvard St., Ventura, Calif. 93003

[22] Filed: Apr. 23, 1973

[21] Appl. No.: 353,283

[52] U.S. Cl. ............................................. 285/321
[51] Int. Cl. ......................................... F16l 39/00
[58] Field of Search.................... 285/321, 276, 340

[56] References Cited
UNITED STATES PATENTS

| 3,521,911 | 7/1970 | Hanes et al. | 285/321 |
| 3,585,803 | 6/1971 | Bardgette | 285/321 |
| 3,776,576 | 12/1973 | Keyser | 285/321 |

FOREIGN PATENTS OR APPLICATIONS

| 1,016,629 | 4/1950 | France | 285/321 |

Primary Examiner—Patrick D. Lawson
Attorney, Agent, or Firm—Richard S. Sciascia; Joseph M. St. Amand; David O'Reilly

[57] ABSTRACT

A quick connect-disconnect fastening device for joining together tubular sections such as a bomb afterbody to a bomb. It is especially adapted to use where resistance to large deforming moments and the withstanding of great vibration stress is anticipated. It includes matching inner and outer grooves located on the parts to be joined and a clamp ring member capable of being drawn into tight engagement with portions of such grooves to restrain separation of the parts.

5 Claims, 6 Drawing Figures

HIGH STRENGTH STRUCTURAL CONNECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The prior art is replete with threadless, high-strength, connectors for the ends of structures such as pipes, conduits, elongated parts to be coupled, etc., and many of these constructions rely upon connector encircling bands for the coupling function. However, each such prior device has its disadvantages in that shifting movement, lashing, looseness, and vibration resistance cannot be assured in order to prevent relative movement and ultimate destruction of the coupling joint formed thereby.

In its illustrated form, this invention is shown employed to join together tubular sections such as a bomb afterbody or tail section to a bomb and, as will be appreciated, structures coupled for this purpose are subjected to great stress forces, vibration of great magnitude, and the inadvertent separation of the parts could result in an intolerable catastrophe.

One respect in which the prior art is deficient is that preload contact surfaces which are "non-peening" are not available to prevent looseness which will be accelerated by vibration and result in coupling failure.

SUMMARY OF THE INVENTION

A quick connect-disconnect fastening device for joining together tubular sections such as a bomb afterbody to a bomb. It includes matching inner and outer grooves and a clamp ring member capable of being drawn into tight engagement to restrain separation of the parts. The joint so formed must prevent any movement of the parts relative to each other which might cause peening and consequent metal fatigue. This is accomplished by placing all joining surfaces under a preload which eliminates all clearances and imposes a high impingement force against alignment shoulders in the joint assembly.

OBJECTS OF THE INVENTION

It is one object of the present invention to provide a quick connect-disconnect fastening device for securely joining together tubular sections.

Another object of the present invention is to provide a quick connect-disconnect fastening device which resists large deforming moments and withstands great vibration stresses.

Yet another object of the present invention is to provide a quick connect-disconnect fastening device having matching inner and outer grooves capable of being drawn into tight engagement to restrain separation of the parts joined.

Yet another object of the present invention is to provide a quick connect-disconnect fastening device which prevents movement of parts by placing all joined surfaces under a preload which eliminates all clearances and imposes a high impingement force against alignment shoulders in the joint assembly.

Other objects, advantages and novel features of the invention will become apparent from the following detailed description of the invention when considered in conjunction with the accompanying drawings.

BRIEF DESCRIPTION OF THE DRAWINGS

Referring to the drawings in detail.

DETAILED DESCRIPTION OF PREFERRED EMBODIMENT

Figure 1:
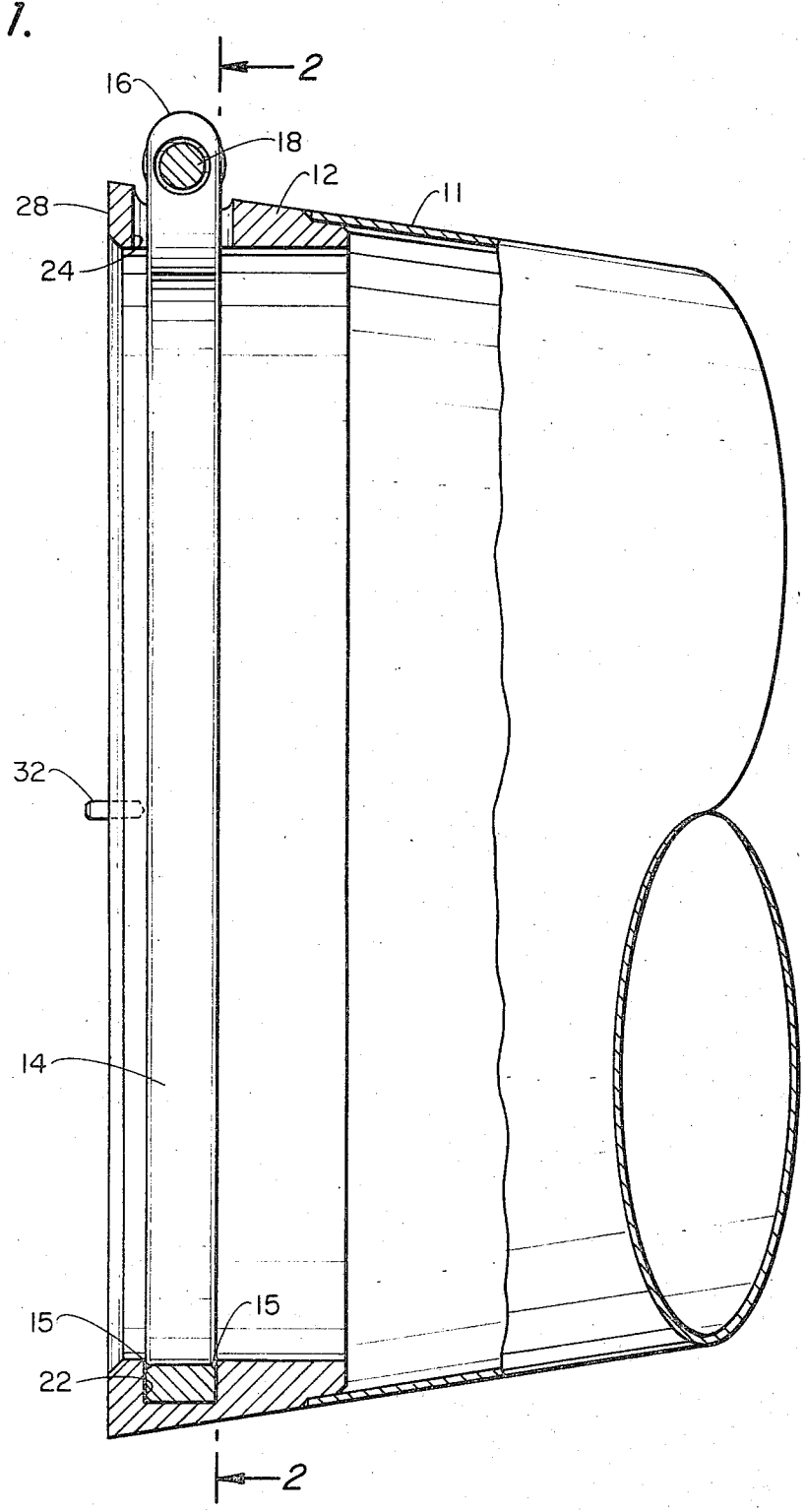
FIG. 1 illustrates a clamp ring particularly adapted for use in conjunction with the present invention.

This joint or fastening device is intended to be used wherever a sleeve or collar is to be securely fastened over a stem, smaller sleeve or collar. It provides maximum strength with a minimum number of parts. In the drawings there is illustrated an embodiment of the present invention wherein an inner cylindrical stem 10 (FIG. 6) is shown joined within a cylindrical stem-encircling sleeve 12. The stem 10 may comprise an extension attached to the afterbody of a bomb or other tubular member. The stem-encircling sleeve 12 may be attached to the forward portion 11 of a conical tail fin assembly or other member to be clamped in place with the bomb afterbody. As illustrated, a clamp ring 14 shown in side elevation in FIG. 1 comprises a single circular band of slightly deformable material having upstanding clamp bolt receiving ears 16 through which a clamp bolt 18 extends. A self-locking clamp nut 20 (FIG. 2) completes the clamp ring assembly.

Figure 2:
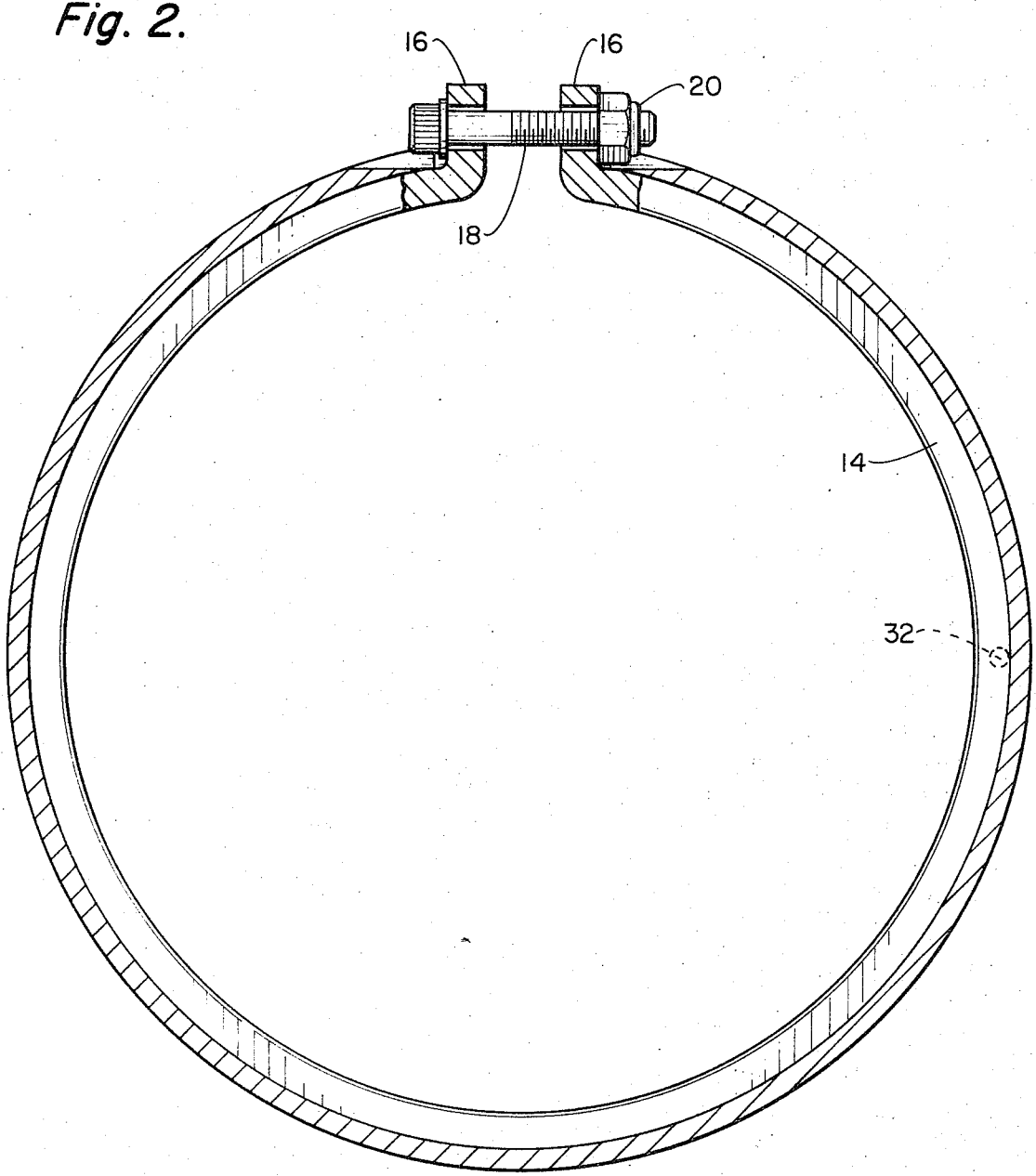
FIG. 2 is a transverse longitudinal view of the device of FIG. 1 showing the clamp ring in place within an encircling sleeve member, such as a bomb afterbody.
Figure 3:
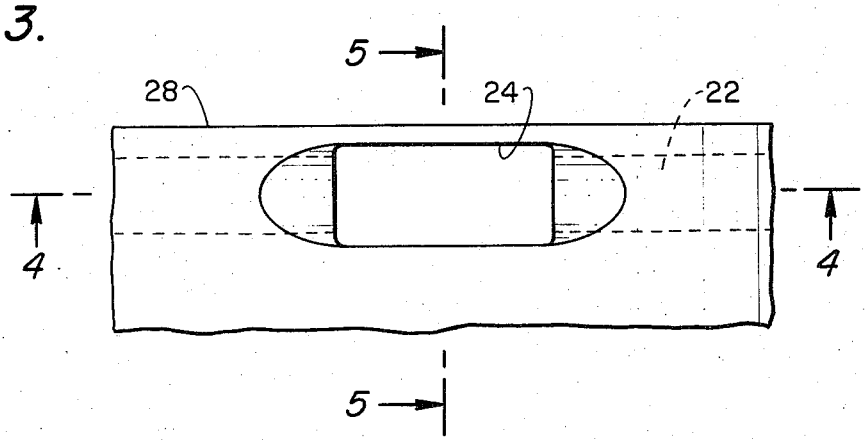
FIG. 3 is a top plan view of the embodiment of FIG. 1.
Figure 4:
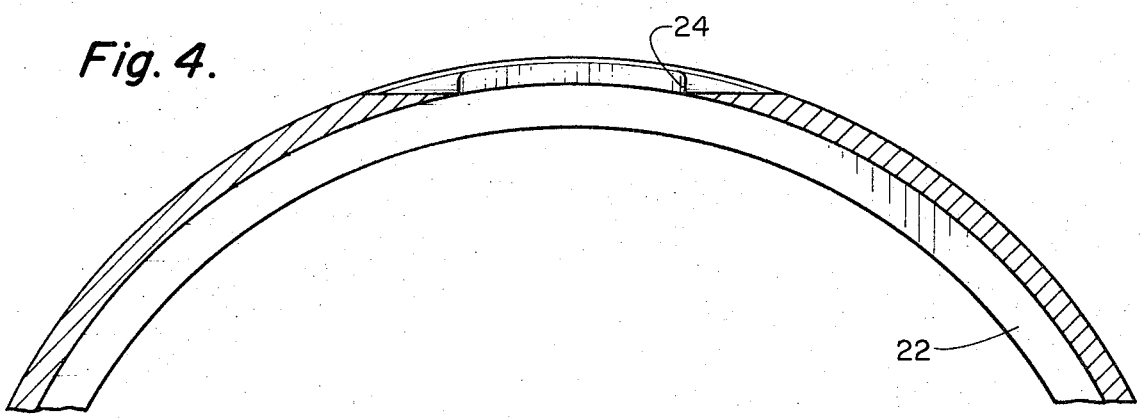
FIG. 4 is a view similar to FIG. 1 but with the clamp ring removed.
Figure 5:
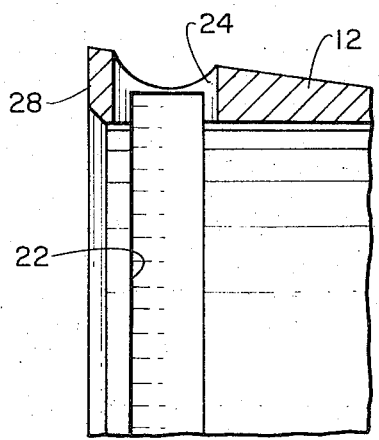
FIG. 5 is a transverse sectional view showing the clamp ring in place within its encircling sleeve.

Referring now to FIG. 2, the clamp ring 14 is shown partially in place on the sleeve 12 attached to the forward end of a missile tail cone 11. This view, particularly at the bottom portion thereof, shows the cross-sectional shape of clamp ring 14. Note that the inner corners 15 of the ring are rounded or chamfered for a purpose which will hereinafter be explained in detail.

Figure 6:
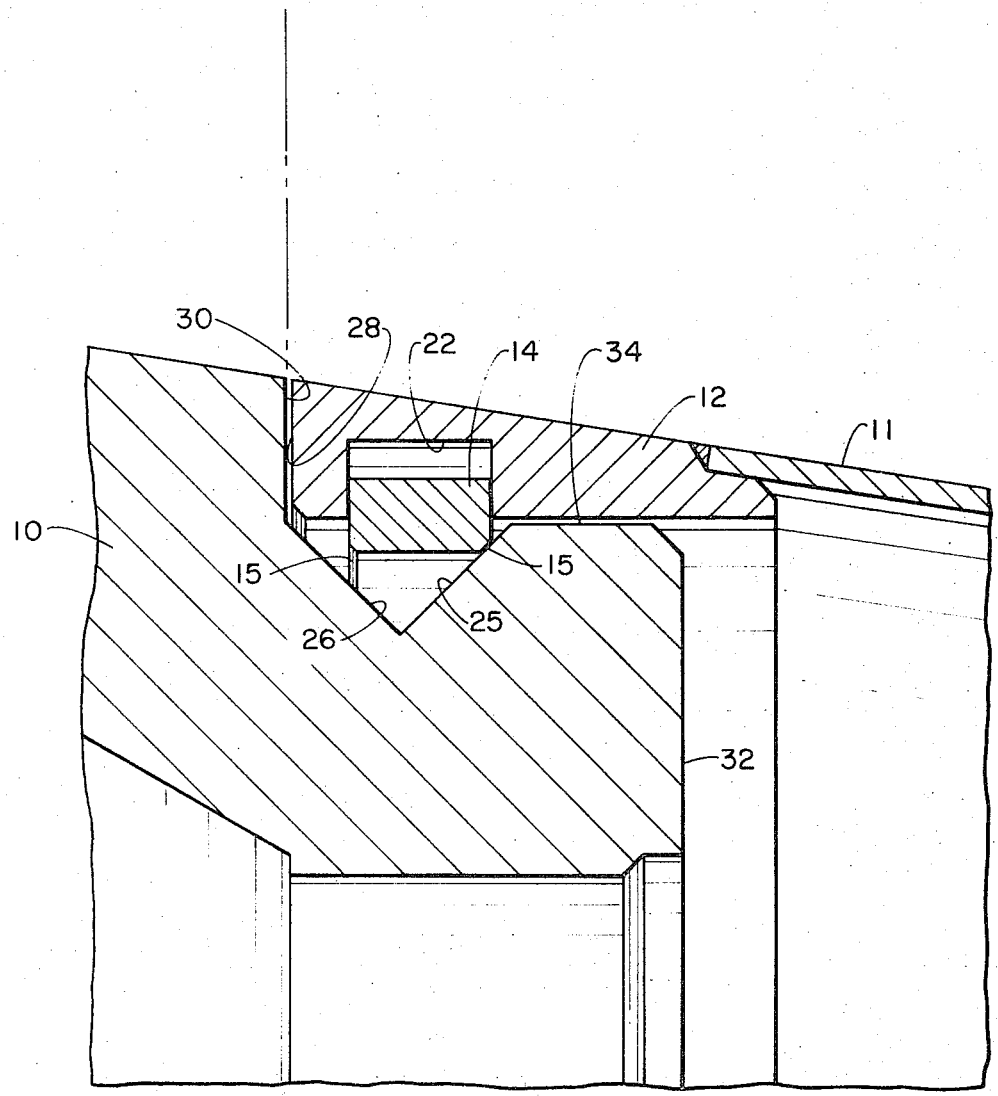
FIG. 6 is an enlarged detailed cross-sectional view of a typical bomb afterbody and tail sections having matching grooves within which the clamp ring is received.

In FIG. 2, as well as in the enlarged cross-sectional view, FIG. 6, the clamp ring 14 is shown in a recessed ear groove 22 in the inner wall of outer sleeve 12 and, as illustrated at the top of FIGS. 1 and 2, the ears 16 protrude upwardly through a windowed slot 24, communicating with groove 22 so that the upwardly protruding ears 16 and the lock bolt 18 and nut 20 are located outside of sleeve 12. Details of this window slot 24 are visible in FIGS. 2, 3, 4 and 5.

In the enlarged detailed view, FIG. 6, is clearly depicted the V-shaped groove 26 which is in a fixed position to groove 22 when the parts are assembled and the clamp ring is ready to be clamped in place. Normally, clamp ring 14 is spring preloaded outwardly so that it firmly sits in groove 22, as shown in FIG. 2. However, after the parts have been fitted together, the clamp ring is tightened by manipulation of bolt 18 and the clamp ring 14 is constricted so that a chamfered inner corner 15, rides upon and slides along the inclined surface 25 of groove 26. Continued contraction of the ring draws the ring and the sleeve 12 forwardly to pull the sleeve 12 tightly over the rear of the stem 10 attached to the bomb afterbody until its forward face 28 presses against the rear shoulder 30 of the stem 10 with a very high impingement force.

It has been found that with this arrangement, the sides of the ring 14 pressing against the adjacent sides of the groove 22 more effectively draw the forward face 28 of the rear sleeve 12 into high impingement force contact with the shoulder 30 of stem 10 when the chamfer, provided at the inner corners of the ring 14, are either rounded, or have a 45° chamfer, as shown, of about 0.040 to form a face upon which the inner corner of the clamp ring may slide as it moves along the face 25 of groove 26.

If desired, an alignment pin 32 (FIG. 1) may be employed in order to prevent tensional movement of the parts and to aid in accuracy of assembly. The pin 32 would mate with a recess in stem 10. However, this is not essential for all applications.

The stem 10 is a cylindrical member rigidly attached to a bomb afterbody, such as by welding, and has a shoulder 30 which has an outside diameter approximately equal to the outside diameter of sleeve 12 as shown in the partial section of FIG. 6. The stem 10 has a projecting flange 32 with a V-shaped groove 26 which is in juxtaposition to groove 22 when the flange is mated with the sleeve. The stem 10 and sleeve 12 are machined to maintain very close tolerances of a few thousandths of an inch between the mating surfaces at 28 and 30 and the outside diameter 34 of the stem flange 32.

Obviously, many modifications and variation of the present invention are possible in the light of the above teachings. It is therefore to be understood that within the scope of the appended claims, the invention may be practiced otherwise than as specifically described.

I claim:

1. A quick connect-disconnect fastening device for joining the ends of tubular members, comprising:

a cylindrical sleeve attached to one end of a first tubular member; said sleeve having a recessed ear groove on the inner wall;

a clamp ring assembly adapted to sit in the recessed ear groove of the sleeve;

a cylindrical stem attached to one end of a second tubular member; said stem having a shoulder and a projecting flange with a V-shaped groove adapted to be in juxtaposition with the recessed groove in the cylindrical sleeve when the stem and sleeve are mated; and means for tightening the clamp ring to draw the stem and sleeve together with a high impingement force.

2. The device of claim 1 wherein;

said sleeve has a windowed slot communicating with the recessed groove;

said means for tightening the clamp ring comprises;

a pair of ears protruding upwardly through the windowed slot in the sleeve;

a lock bolt passing through the pair of ears outside the sleeve; and a lock nut on said bolt for drawing the two ears together thereby tightening the ring clamp.

3. The device of claim 2 wherein the ring clamp has a chamfered inner corner which rides upon and slides along one of the inclined surfaces of the V-shaped groove in the stem whereby a high impingement force is produced when the clamp ring is tightened.

4. The device of claim 3 including:

an alignment pin on the forward face of the sleeve; and a recess in said stem adapted to mate with the alignment pin to prevent tensional movement of the sleeve and stem and to aid in accuracy of assembly.

5. The device of claim 4 wherein:

the first tubular member is a tail cone; and the second tubular member is a bomb afterbody.

* * * * *